June 16, 1953 — G. P. McCOUCH — 2,642,472
MONITORED POWER OUTPUT SYSTEM FOR RESONATOR CAVITIES
Filed Sept. 29, 1948
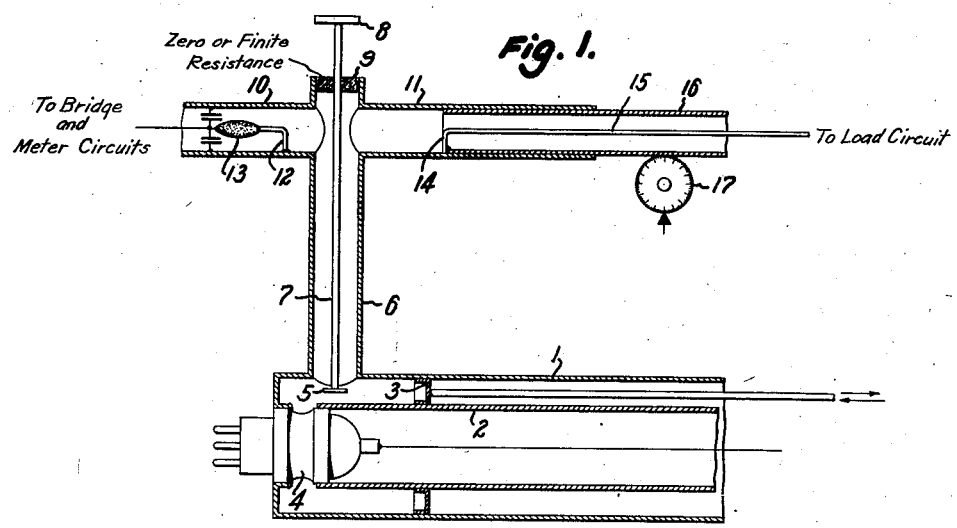
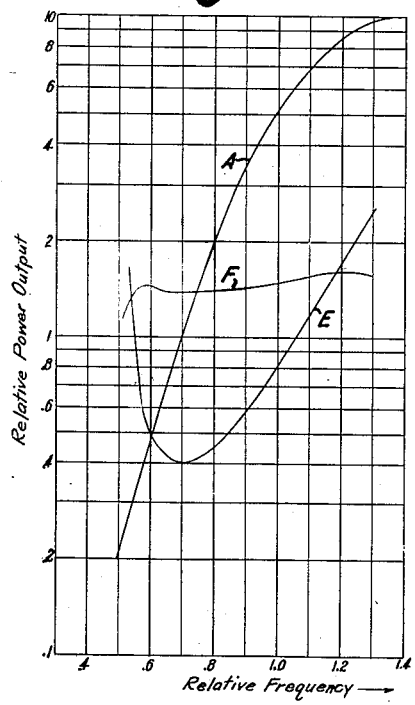
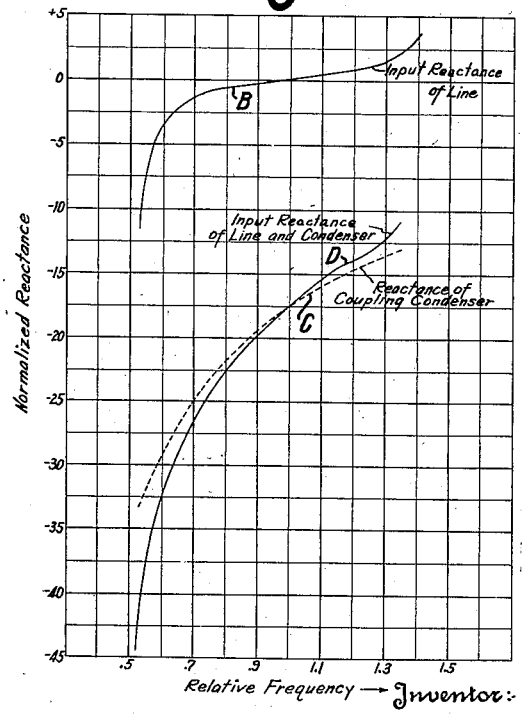
Inventor:
Gordon P. McCouch,
By Pierce, Scheffler & Parker,
Attorneys.

Patented June 16, 1953

2,642,472

UNITED STATES PATENT OFFICE 2,642,472

MONITORED POWER OUTPUT SYSTEM FOR RESONATOR CAVITIES

Gordon P. McCouch, Mountain Lakes, N. J., assignor to Aircraft Radio Corporation, Boonton, N. J., a corporation of New Jersey Application September 29, 1948, Serial No. 51,825

9 Claims. (Cl. 171—95)

1

This invention relates to monitored output systems for microwave generators, and more particularly for microwave generators which are tunable over a wide band of frequencies.

The term "microwave" is here employed to indicate those portions of the frequency spectrum in which energy is normally transmitted within and between electrical circuits by means of closed conducting pipes, i. e., waveguides, or by coaxial pairs of conductors, or by both waveguides and coaxial conductors.

Output systems for supplying microwave energy to a load circuit in predetermined or measured amounts comprise two basic elements, or the functional equivalents thereof, in addition to the tunable resonator cavity of the generator, namely an indicator pickup for supplying energy to the detector of a measuring system and an output pickup for supplying energy to the load circuit. When, as is usually desired, the energy input to the load circuit is to be adjusted over a wide range, the output pickup element is at the input end of a coaxial pair of conductors, the pair of conductors being telescoped into and slidable within a waveguide of small cross-section compared with the wavelength. This assembly constitutes a waveguide-below-cutoff attenuator, and the function of the sensitive detector element, hereinafter assumed to be a bolometer, and associated meter circuit is to indicate the microwave energy level at the mouth of the attenuator waveguide, thereby permitting adjustment of the appropriate variable or variables to establish a preselected energy level at that point. It is well known that a loop type of pickup element is highly desirable in the attenuator waveguide, and it is customary to employ a loop type of pickup for the indicator since all monitoring systems of this general type are accurate only to the extent that the wave-field energy present at the input end of the attenuator waveguide bears a constant ratio (throughout variations in frequency, generator power level, etc.) to the wave-field energy which actuates and is indicated by the bolometer element and associated meter circuit. Further, although magnetic loops are desirable for both the output pickup and the indicator pickup, it is a characteristic of the tunable resonator cavity of typical microwave generators that the magnetic field is always a maximum at the outer end, adjacent the short-circuiting tuning plunger, and is a minimum around the fixed end, in the vicinity of the tube, where the electrical field is a maximum.

2

The prior apparatus falls into two general types which may well be termed "side arm" pickup and "two tube" pickup according to their mechanical configuration. In the side arm pickup, the coaxial conductors connecting the pickup loop of the indicator system to its bolometer element extend laterally from the inner end of the resonator cavity, and the attenuator waveguide which delivers energy to the load circuits is fed from the coaxial line of the indicator system. In the two tube pickup, separate waveguides below cut-off and pickup loops are provided for the indicator and the power output systems, the waveguides being symmetrically arranged with respect to the resonator cavity. A major defect of the side arm pickup is that it is essentially a frequency-dependent structure and operable over an extremely limited frequency range, because the indication of the reference power level at the mouth of the attenuator waveguide, as provided by the bolometer and meter circuits, varies with frequency according to a law different from that which relates the power absorbed by the output pickup loop to the operating frequency. Another disadvantage is that the bolometer element must operate at an appreciably higher power level than that which can be extracted from the attenuator waveguide. This imposes a serious limitation upon the maximum power available for the load circuit when particularly convenient types of thermistor bolometer elements are employed in the indicator system.

The major disadvantage of the two tube pickup is that the starting point or "zero" of the waveguide attenuator varies with frequency. This follows from the fact that the generator output and the pickup loop transfer efficiency vary with frequency and that, in general, it is not convenient or desirable to alter the tube-energizing potentials to obtain a substantially constant output over the tuning range. The indicator pickup loop must be adjusted along its waveguide to that point at which the desired reference power level is established, and this necessitates a similar preliminary adjustment of the output pickup loop in its waveguide, or, as is more usual, an adjustment of the fiducial mark of the calibrated dial of the attenuator waveguide.

Objects of the present invention are to provide wide-band monitored output systems for tunable microwave generators which are free from the disadvantages and defects of the prior arrangements. Objects are to provide output systems of the type stated which compensate for the variation of power output with frequency of certain wide-band microwave generators, thereby to minimize the adjustments required to establish a preselected load circuit input over a wide range of frequencies. Another object is to provide monitored output systems for a microwave generator which may be termed of T type to distinguish it from the prior side arm and two tube types, the power inputs to the indicator system and to the attenuator waveguide of the load circuit being branched symmetrically from a pickup coaxial line which preferably, but not essentially, has an elongated probe pickup connection with the resonator cavity of a microwave generator.

These and other objects and the advantages of the invention will be apparent from the following specification when taken with the accompanying drawings in which:

Fig. 1 is a longitudinal section through a tunable reflex Klystron microwave generator provided with a monitored output system embodying the invention; and Figs. 2 and 3 are curve sheets showing typical variations with frequency of reflex Klystron generator power outputs for pickup lines of different resonance characteristics and of the input impedance of a resonant pickup line, respectively.

In a reflex Klystron oscillator of conventional type, microwave power is generated in a coaxial cavity resonator consisting of an outer conductor 1, an inner conductor 2 and a movable short-circuited plunger 3, by means of suitable electrodes, not shown, within an evacuated envelope or Klystron tube 4.

An electromagnetic field, with its electric and magnetic components, is established in the space between the conductors 1, 2 and one or both of these components operates by virtue of a pickup element 5 to establish a current in a coaxial line comprising an outer conductor 6 and an inner conductor 7 which extend laterally from the outer conductor 1 of the cavity. The pickup element 5 may be a loop energized by the magnetic components of the field but preferably, as illustrated, is energized by the electric components of the field and comprises a probe or small disc on the inner end of the conductor 7. A knob 8 or other appropriate means for axial adjustment of the conductor 7 is provided at the exterior of the terminating impedance 9 which extends across the outer end of the conductor 6. The impedance 9 may be a metal disc of low resistance which has a central aperture through which the conductor 7 extends and is guided for axial movement, or the element 9 may be a metal, alloy or a molded plastic having a substantial electrical resistance. As will be explained later, the magnitude of the impedance of the element 9 at the operating frequencies affects the relation of power output to oscillator frequency when the cavity is tunable over a range of frequencies by adjustment of the short-circuiting plunger 3.

A pair of tubes 10, 11 of identical diameter branch laterally and symmetrically from the conductor tube 7 near the outer end thereof, and tubes 10 and 11 are waveguides below cutoff for all radio frequencies involved. The current flow established in the coaxial line 6, 7 by the pickup element 5 sets up an electromagnetic field in the space between the coaxial conductors 6, 7 and this, in turn, excites fields in the tubes 10, 11. Since these tubes are of identical diameter and are symmetrically located with respect to the line 6, 7, the same field will be excited in both tubes. The field in tube 10 is sampled by a coupling element 12 and the extracted power is dissipated in a bolometer element 13 which through conventional bridge and meter circuits, not shown, measures the field existing in the neighborhood of the coupling element 12. By symmetry, this same field exists at the corresponding point in tube 11, and the load circuit may be supplied with power at the level measured by bolometer 13 and associated circuits by arranging a pickup element 14 in tube 11 at the reference point, the pickup elements 12 and 14 being of course of the same type and having the same frequency characteristics when feeding their respective loads.

For many types of equipment, for example for signal generators, it is necessary or at least highly desirable to adjust the power output over a wide range, and the output pickup element 14 is therefore adjustable along the tube 11, i. e., the pickup element 14 is a loop at the end of a coaxial line comprising a central conductor 15 and an outer conductor or tube 16 which is telescoped into tube 11. The loop 14 and line 15, 16 sliding within tube 11 form a waveguide-below-cutoff attenuator of conventional form. The relative position of the loop 14 within the tube 11 may be indicated by a graduated dial 17 on the gearing, not shown, by which the tube 16 is displaced, the dial 17 being graduated directly in terms of power delivered to, or current in, or voltage across a load which properly terminates the output line 15, 16. The described apparatus may well be identified as a T type of monitored output system to distinguish from the prior systems which have been identified as side-arm and two-tube pickup systems. The coaxial line 6, 7 forms the stem of the T pickup and the head of the T is provided by the tubular conductors 10 and 11 respectively.

It is particularly to be noted that the coupling or pickup element 12 of the indicator system is located at a fixed point within the waveguide 10, thereby distinguishing from the prior "two tube" type of monitored output systems. The practical significance of this difference is that the present T type of output system establishes a reference level of wave-field energy at a fixed point in output tube 11, whereby the position of tube 16 at minimum attenuation is the same for all frequencies and the "roving fiducial mark" of the graduated attenuator dial of the "two tube" output system is eliminated. The fixed location of the indicator pickup loop 12 is made possible by this invention since the wave-field level at the indicator loop 12 is controlled by adjustment of the pickup probe 5, 7. Alternatively, the energy level at loop 12 could be adjusted for a fixed position of the pickup probe 5, 7 by varying the size of the apertures at the junctions of tubes 10 and 11 with tube 7.

It will be observed that the location of coupling element 12 in waveguide-below-cutoff 10 determines the indication obtained from the bolometer circuit for a given current flow in line 6, 7. The attenuation offered by the length of tube 10 between coupling element 12 and coaxial line 6, 7 is very nearly independent of frequency for a tube 6 of a diameter sufficiently small compared with the operating wavelength. Thus by proper choice of the position for element 12, the bolometer element 13 may be operated at any convenient power level. In particular, the bolometer element 13 may be operated at a lower power level than the maximum obtainable in the output circuit. Such operation may be very desirable in cases wherein large outputs are desired from a powerful generator, but using bolometer elements of small power handling ability. The present invention obviates the need for lumped constant attenuating networks which are often very frequency sensitive. It is obvious that bolometer element 13 may also be operated at the same or higher power levels than are attainable in the output load circuit by proper adjustment of stops on the output attenuator.

It is evident that a definite predetermined power level is established at the inlet ends of branch tubes 10 and 11 upon adjustment of probe 5 to obtain a preselected reading or indication at the measuring apparatus and that, when this adjustment is completed, the power indicated by the calibrated dial 17 is available at the output terminals. It is further obvious that since the fiducial mark against which dial 17 is read is fixed, a given setting of the output attenuator, as indicated by dial 17, always corresponds to the same power output, assuming the probe 5 has been correctly set, irrespective of operating frequency, tube ageing, etc., to obtain the preselected reading or indication at the measuring apparatus.

The impedance of the termination 9 of the coaxial line 6, 7 is preferably so selected as to introduce resonance effects which compensate to a greater or less extent for the characteristic variations in the generator field intensity at the pickup element 5, and for the transfer efficiency variations of the coupling elements 5, 12 and 14, on adjustment of the plunger 3 to tune the generator over a range of frequencies. When the impedance of the termination 9 is made equal to the characteristic impedance $Z_0$ of line 6, 7 at the middle frequency $f_0$ of the generator tuning range, the line 6, 7 is non-reflecting, its input impedance does not vary with the generator tuning, and no compensation for these characteristics is obtained. With such a non-reflecting line and assuming that no other adjustments are made when the plunger 3 is adjusted to tune the generator over a 2:1 range in frequency, the relative power output will vary over a range of the order of 25:1, as indicated by curve A of Fig. 2.

When the termination 9 is a simple short-circuiting plug, and the electrical length of line 6, 7 is a half wave-length at frequency $f_0$, the input reactance of line 6, 7 varies as indicated by curve B of Fig. 3. The reactance of coupling condenser 5 varies with frequency as shown by curve C of Fig. 3, and the resulting impedance $Z_{in}$ seen by the generator due to coupling condenser 5 and line 6, 7 varies with frequency as indicated by curve D of Fig. 3. The input current to coupling line 6, 7 varies inversely as $Z_{in}$. The short circuit termination current which excites the output waveguides 10 and 11 is equal to the input current divided by the cosine of the electrical length of line 6, 7. This relationship between input and termination currents in the resonant coupling line 6, 7 is responsible for the compensating effect obtained. The relative output power vs. frequency characteristic for a T output system with a short-circuiting termination 9 for the stem 6, 7 is shown by curve E of Fig. 2. The short-circuited termination thus provides over-compensation for the generator characteristic as the power falls off between the end frequencies, but the radio frequency power level at the indicator pickup 12 and output supply pickup 14 varies by less than 3 to 1 for a frequency range of 2 to 1, as contrasted with the uncompensated variation of 25 to 1, curve A. This 3 to 1 range is quite satisfactory for most practical purposes as the pickup element 5 may be adjusted by knob 8 to restore the power levels at the bolometer and at the attenuator input to their predetermined reference level when compensation is not complete.

The variation of the power with frequency, for fixed settings of the Klystron and output system adjustments, may be reduced to a still lower magnitude by selecting a finite value of impedance for the termination to introduce a desired degree of reflection into line 6, 7 whereby the resonance characteristic of line 6, 7 is less marked than for a short-circuit termination, and in consequence less compensation is obtained. By proper choice of termination approximately complete compensation may be obtained as indicated by curve F of Fig. 2.

The terminating impedance of the stem 6, 7 of the T output system may be of mixed character to afford improved compensation for the Klystron generator characteristic, or to afford a desired compensation for other or more complex generator characteristics. Whether or not the stem 6, 7 of the T output system is resonant to provide more or less complete compensation for the generator characteristic, the stem 6, 7 feeds both the indicator pickup and the output supply pickup symmetrically and uniformly for all absolute power levels and frequencies, thus automatically providing the desired broad band constancy of ratio of the attenuator input power to the reference power indicated by the bolometer.

This constant ratio eliminates the "roving fiducial mark" of prior monitored output power systems. The measuring range is further extended by resonating the stem 6, 7 to compensate, in full or in part, for the generator and coupling element power-frequency characteristics. When the impedance of the termination 9 is a short-circuit, or nearly so, a maximum of current and minimum of voltage occur near the termination 9 and, by locating the indicator tube 10 and output tube 11 as near as possible to the termination 9, the magnetic coupling to these tubes is excellent and the static coupling is very weak. This results in excellent attenuator linearity out to even very close couplings when the pickup elements 12 and 14 are loops, and the improved linearity leads to improved accuracy of the system and permits calibration of dial 17 beyond the range of linear attenuation.

The illustrated apparatus is the presently preferred monitored power output system for a reflex Klystron generator but it is to be understood that variations are possible without departure from the spirit and scope of the invention as set forth in the following claims.

I claim:

1. A monitored power output system for a resonator cavity having an opening in a wall thereof; said power output system comprising a stem tube having an open end adapted to be seated over the opening in the wall of a resonator cavity, a conductor coaxial with said stem tube and forming therewith a coaxial transmission line, an electrical termination for the end of said transmission line remote from the resonator cavity, said conductor being axially adjustable in said electrical termination and carrying a pickup element for coupling said transmission line to the resonator cavity, a pair of branch tubes of identical cross-section opening into said stem tube adjacent to and symmetrically located with respect to said electrical termination, each of said branch tubes constituting a waveguide below cutoff over the frequency range of wave-fields to be developed in the resonator cavity, pickup elements of the same type and having substantially identical frequency characteristics located in the respective branch tubes for delivering power through coaxial transmission lines to a power meter and a load respectively, the pickup element feeding the power meter being fixed in its branch tube, means supporting the pickup element of the other branch tube for adjustment longitudinally thereof to vary the power delivered to the load, and means for indicating the power delivered to the load; said indicating means comprising a graduated dial element and a fiducial mark element, one of said elements being stationary and the other being connected to said supporting means for adjustment thereby.

2. A monitored power output system as recited in claim 1, wherein the pickup element on said conductor is an electrical field probe.

3. A monitored power output system as recited in claim 1, wherein said pickup elements within said branch tubes are loops.

4. A monitored power output system as recited in claim 1 and for use with a tunable resonator cavity in which the available power output varies from a maximum at about the middle of the tuning range to minima at the limiting frequencies of the tuning range, wherein the impedance of said electrical termination is substantially less than the characteristic impedance of said coaxial transmission line comprising said stem tube and said conductor, and wherein the electrical length of said coaxial transmission line is approximately one-half wavelength at the center frequency of the tuning range.

5. A monitored power output system as recited in claim 1, wherein said electrical termination is a short-circuit connection between said stem tube and the adjacent portion of said conductor arranged coaxially thereof.

6. A monitored power output system as recited in claim 1, wherein said electrical termination has a finite impedance of an order substantially less than the impedance of the coaxial line comprising said stem tube and its coaxially located conductor.

7. In a monitored power output system for use with a source of electromagnetic wave energy, an assembly of three tubes as the stem and symmetrically arranged branches of a T, the branch tubes joining the stem tube adjacent one end thereof and being waveguides-below-cutoff over the frequency range of wave-fields established in said stem, means providing an electrical termination for that end of the stem tube, a coaxial conductor electrically connected to and axially slidable in said terminating means, a pickup element carried by said conductor for withdrawing energy from said source for transmission to said branch tubes, a waveguide-below-cutoff attenuator in one of said branch tubes and having a pickup loop at the end thereof adjacent said stem tube, and a pickup loop in fixed position within the other branch tube for connection to a power meter.

8. In a monitored power output system, the invention as recited in claim 7, wherein the pickup element carried by said coaxial conductor is a probe.

9. In a monitored power output system, the invention as recited in claim 7, wherein said terminating means is a short-circuiting plug.

GORDON P. McCOUCH.

References Cited in the file of this patent

UNITED STATES PATENTS

| Number | Name | Date |
| --- | --- | --- |
| 2,296,678 | Linder | Sept. 22, 1942 |
| 2,399,481 | George | Apr. 30, 1946 |
| 2,403,289 | Korman | July 2, 1946 |
| 2,411,553 | Ramo | Nov. 26, 1946 |
| 2,427,752 | Strempel et al. | Sept. 23, 1947 |
| 2,433,011 | Zaleski | Dec. 23, 1947 |
| 2,439,527 | Paulson | Apr. 13, 1948 |
| 2,454,062 | Holman | Nov. 16, 1948 |

OTHER REFERENCES

Proceedings of Institute of Radio Engineers, vol. 34, No. 10, Oct. 1946, p. 782, copy in 178-44-(1D).